(No Model.)

J. W. OVERSTREET.
HARNESS ATTACHMENT.

No. 541,671. Patented June 25, 1895.

Witnesses:
F. L. Ourand
W. L. Coombs

Inventor:
John W. Overstreet
by Louis Bagger & Co
Attorneys.

UNITED STATES PATENT OFFICE.

JOHN WILLIAM OVERSTREET, OF LITTLE HICKMAN, KENTUCKY.

HARNESS ATTACHMENT.

SPECIFICATION forming part of Letters Patent No. 541,671, dated June 25, 1895.

Application filed April 5, 1895. Serial No. 544,606. (No model.)

*To all whom it may concern:*

Be it known that I, JOHN WILLIAM OVERSTREET, a citizen of the United States, and a resident of Little Hickman, in the county of Jessamine and State of Kentucky, have invented certain new and useful Improvements in Harness Attachments; and I do hereby declare that the following is a full, clear, and exact description of the invention, which will enable others skilled in the art to which it appertains to make and use the same, reference being had to the accompanying drawings, which form a part of this specification.

My invention relates to harness attachments, and its object is to provide an improved hook, by which parts of the harness may be readily connected together, when desired, without any liability of accidental disengagement, but which can be easily disconnected when necessary.

The device is more especially intended for use in connection with the back-band for holding the traces; but can be employed generally for connecting one part to another.

The invention consists in the novel construction and combination hereinafter fully described and claimed.

Figure 1:
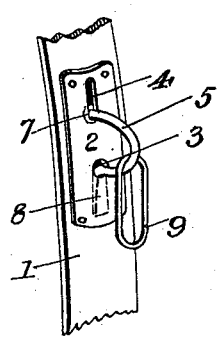
Figure 2:
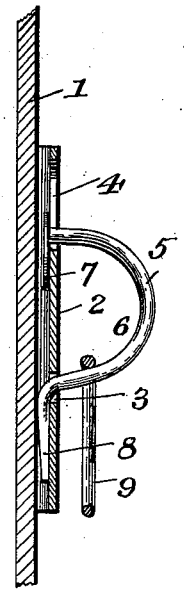
Figure 3:
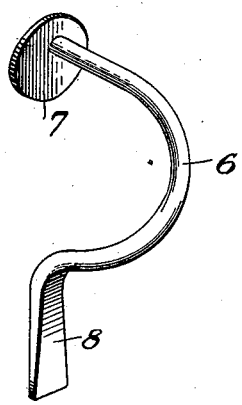

In the accompanying drawings, Figure 1 is a view showing a portion of a back-band of a harness with my improvement applied thereto. Fig. 2 is a detail sectional view, and Fig. 3 is a perspective view of the hook detached.

In the said drawings, the reference-numeral 1 designates the back-band of any ordinary harness, to which is secured or riveted a piece of leather, 2, formed with a circular aperture, 3, near one end, and an elongated rectangular slot, 4, near the other end.

The numeral 5 designates a hook, made of a single piece of metal and comprising the curved or semi-circular portion 6, the head 7, and the flattened lateral portion 8.

In using the device, the leather strap 2 is bent or crimped at the center, and the head, 7, of the hook, passed through the slot 4, and pushed to the outer end thereof. The flattened portion is then inserted into the aperture 3, and the hook then pushed in the opposite direction, when the said flattened end will slide under the leather-strip and the hook be securely held in place. A reverse operation will disengage the hook.

The numeral 9 designates the link of the chain, which serves as a trace-holder, engaged with the hook.

I am aware that a hook or curved staple, having a flattened head at one end, and a pointed spur at the opposite end, is not new; such a device having been used before as a fastener for detachable buttons and for other purposes; and I do not, therefore, claim such a device broadly; but

What I claim as my improvement, and desire to secure by Letters Patent, is—

The combination with the harness-strap or band 1, of the longitudinally-crimped leather strap 2 provided at one end with a circular aperture 3 and at the other end with a narrow rectangular slot 4; in combination with the detachable hook-shaped staple 5 having the flattened circular head 7 at one end, and a flattened, wedge-shaped tongue, 8, at the other end; substantially as and for the purpose herein shown and set forth.

In testimony that I claim the foregoing as my own I have hereunto affixed my signature in presence of two witnesses.

JOHN WILLIAM OVERSTREET.

Witnesses:
E. H. BRUNER,
MATTIE FERRELL.